(12) United States Patent
Inamdar

(10) Patent No.: US 7,792,274 B2
(45) Date of Patent: Sep. 7, 2010

(54) TECHNIQUES FOR PERFORMING MULTI-MEDIA CALL CENTER FUNCTIONALITY IN A DATABASE MANAGEMENT SYSTEM

(75) Inventor: Sonali Inamdar, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1298 days.

(21) Appl. No.: 10/981,982

(22) Filed: Nov. 4, 2004

(65) Prior Publication Data

US 2006/0093124 A1    May 4, 2006

(51) Int. Cl.
*H04M 3/00* (2006.01)
(52) U.S. Cl. ............................. 379/265.02; 379/265.12
(58) Field of Classification Search ............... 379/265.2; 709/238, 215, 207
See application file for complete search history.

(56) References Cited

U.S. PATENT DOCUMENTS

| | | | |
|---|---|---|---|
| 5,222,217 A | 6/1993 | Blount et al. | |
| 5,357,612 A | 10/1994 | Alaiwan | |
| 5,546,570 A | 8/1996 | McPherson et al. | |
| 5,790,807 A | 8/1998 | Fishler et al. | |
| 5,867,665 A | 2/1999 | Butman et al. | |
| 5,867,667 A | 2/1999 | Butman et al. | |
| 5,870,562 A | 2/1999 | Butman et al. | |
| 5,884,035 A | 3/1999 | Butman et al. | |
| 6,026,430 A | 2/2000 | Butman et al. | |
| 6,029,205 A | 2/2000 | Alferness et al. | |
| 6,170,011 B1 * | 1/2001 | Macleod Beck et al. | 709/224 |
| 6,405,191 B1 | 6/2002 | Bhatt et al. | |
| 6,473,794 B1 | 10/2002 | Guheen et al. | |
| 6,480,500 B1 | 11/2002 | Erimli et al. | |
| 6,519,571 B1 | 2/2003 | Guheen et al. | |
| 6,536,037 B1 | 3/2003 | Guheen et al. | |
| 6,622,057 B1 | 9/2003 | Ko et al. | |
| 6,823,384 B1 * | 11/2004 | Wilson et al. | 709/225 |
| 6,826,182 B1 | 11/2004 | Parthasarathy | |
| 7,031,974 B1 | 4/2006 | Subramaniam | |

(Continued)

OTHER PUBLICATIONS

Office Action for U.S. Appl. No. 10/443,206, mailed Nov. 10, 2005, 10 pages.

(Continued)

*Primary Examiner*—Curtis Kuntz
*Assistant Examiner*—Amal Zenati
(74) *Attorney, Agent, or Firm*—Hickman Palermo Truong & Becker LLP; Eric L. Sutton

(57) ABSTRACT

Techniques for performing queuing and distribution functionality are provided. In an embodiment involving a multi-media call center, an item to be handled by an agent is received at a database server. The item may be a media item, which is a request for communication over any medium supported by a multi-media call center. The item may be stored in an item queue in a database. A number of agents may be registered with the database server to handle any items in which the agent is eligible. Eligible agent data that indicates which agents are eligible to handle the item is stored, in association with the item, in a repository managed by the database server. A selection is made, based at least in part on the eligible agent data, of which agent is to handle the item. The item may thereafter be moved to a matched item queue.

30 Claims, 3 Drawing Sheets

U.S. PATENT DOCUMENTS

| | | |
|---|---|---|
| 7,068,775 B1 | 6/2006 | Lee |
| 7,092,975 B2 | 8/2006 | Bradley et al. |
| 7,181,482 B2 | 2/2007 | Jain et al. |
| 7,185,033 B2 | 2/2007 | Jain et al. |
| 7,185,034 B2 | 2/2007 | Jain et al. |
| 7,203,706 B2 | 4/2007 | Jain et al. |
| 7,366,713 B2 | 4/2008 | Kaluskar et al. |
| 7,395,310 B1 * | 7/2008 | Sikora et al. ................ 709/201 |
| 2002/0144010 A1 | 10/2002 | Younis et al. |
| 2003/0059029 A1 * | 3/2003 | Mengshoel et al. .... 379/265.02 |
| 2003/0177045 A1 * | 9/2003 | Fitzgerald et al. .............. 705/6 |
| 2003/0177187 A1 | 9/2003 | Levine et al. |
| 2003/0212834 A1 | 11/2003 | Potter et al. |
| 2004/0024771 A1 | 2/2004 | Jain et al. |
| 2004/0030707 A1 | 2/2004 | Lu et al. |
| 2004/0034618 A1 | 2/2004 | Lu et al. |
| 2004/0034619 A1 | 2/2004 | Lu et al. |
| 2004/0107125 A1 | 6/2004 | Guheen et al. |
| 2005/0198207 A1 | 9/2005 | Hoblit |
| 2005/0222996 A1 | 10/2005 | Yalamanchi |
| 2006/0218194 A1 | 9/2006 | Yalamanchi |
| 2006/0224542 A1 | 10/2006 | Yalamanchi |

OTHER PUBLICATIONS

Office Action for U.S. Appl. No. 10/443,206, mailed Jun. 1, 2006, 5 pages.

* cited by examiner

TECHNIQUES FOR PERFORMING MULTI-MEDIA CALL CENTER FUNCTIONALITY IN A DATABASE MANAGEMENT SYSTEM

FIELD OF THE INVENTION

The present invention generally relates to associating items with eligible consumers.

BACKGROUND

A traditional call center enables telephone calls, from users requiring service, to be routed to agents capable of providing the required service. For example, a person who placed a call to inquire about a company's product may have their call routed to a call center, so that the call center may direct their call to the first available company representative who can handle their inquiry.

As the popularity of the World Wide Web (Web) has grown, the number of ways in which customers interact with company's representatives has also increased. For example, many customers may access a company's web page to request that a company representative call them back, to send an email to a company representative, or to initiate a live chat session with a company representative. Thus, it is desirable for call centers to process not only telephone calls, but other types of communication as well.

One approach for implementing a call center involves the use of a single server that maintains a queue in volatile memory. The server stores communication requests from users in the queue, and removes communication requests from the queue whenever a company representative requests a communication request from the queue. Unfortunately, this approach has an upper bound on the number of communication requests that may be simultaneously processed by the server, as the volatile memory of the server may only store information about a certain number of communication requests at the same time. Further, if the server crashes, then all information in the queue is lost, as the queue is maintained only in volatile memory.

In another approach, multiple servers may be employed. Each server maintains a queue of communication requests. However, the functional component that determines which communication request should be processed by an available agent must inspect items in each queue at each server, thereby requiring a distributed locking scheme. The distributed locking scheme results in a high overhead in accessing each queue in each server, and due to its complexity, is susceptible to programming errors (or "bugs").

Consequently, an approach for performing queuing and distribution functionality for a call center that does not incur the problems associated with the above approaches is desirable. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
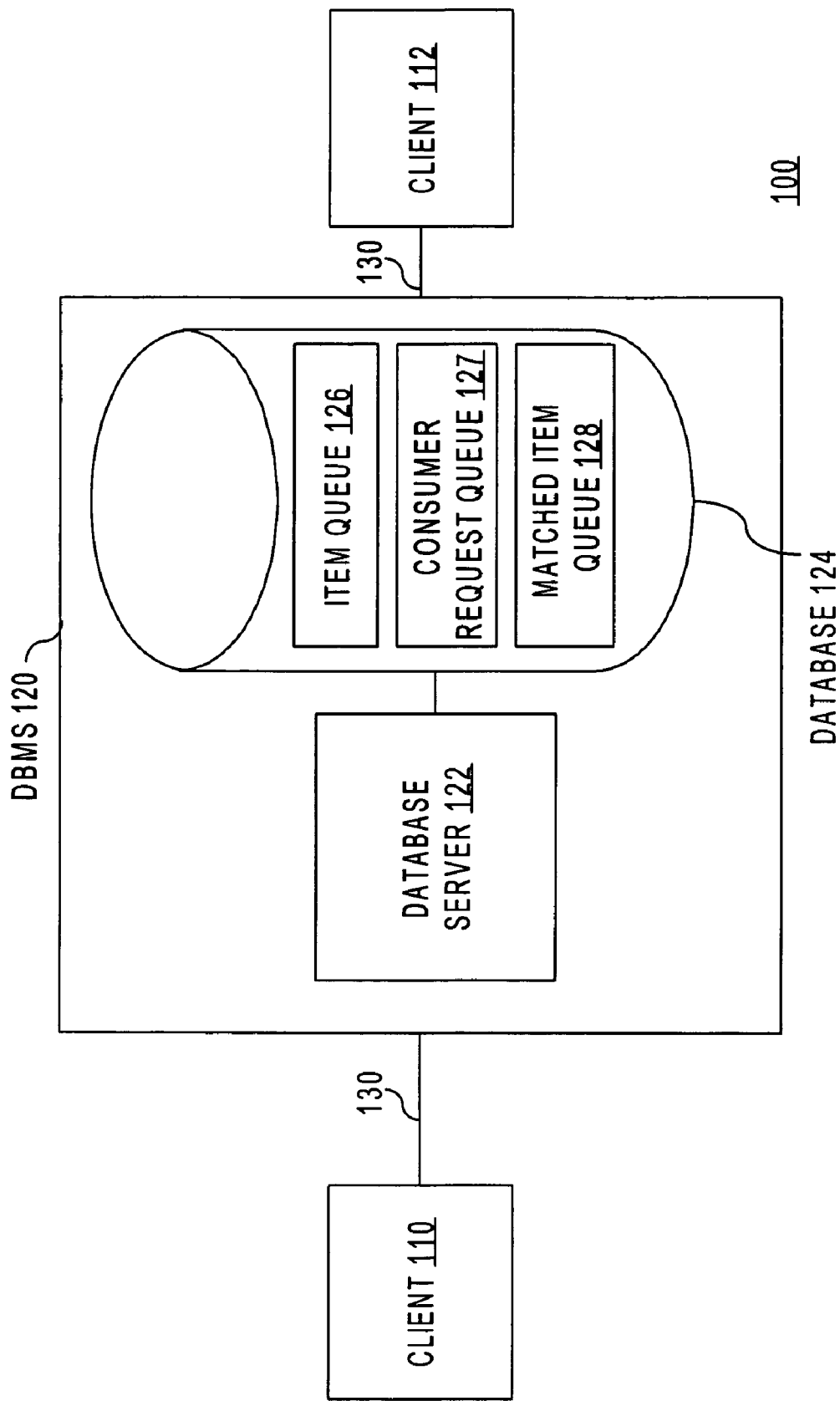
FIG. 1 is a block diagram of the functional components of a system according to an embodiment of the invention.

In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Functional Overview

Techniques are provided for performing queuing and distribution functionality. A system is disclosed herein for efficiently matching each of a plurality of consumers to items of a plurality of items. Each item may correspond to any discrete component that may be consumed by a consumer. A consumer is any human or non-human entity that is capable of consuming (for example, by processing or handling) an item.

When the system receives item, the system stores the item in an item queue. When the system receives requests from consumers to consume an item, the system stores the requests to consume an item in a consumer queue. Items and requests to consume an item may each be received by the system at any time, independent from one another. Each request from a consumer to consume an item is matched with a particular item by the system according to a set of rules. For an item to be matched with a particular request to consume an item, the characteristics of an item (such as item type and service level, each explained in greater detail below) must not be in conflict with the characteristics of the request to consume an item. An item may only be consumed by one consumer, and only one item may be consumed by a consumer at a time. Once an item is consumed by the consumer, the item is removed from the system.

The techniques disclosed herein are particularly useful for multi-media call centers. A multi-media call center is a call center that is capable of processing at least two different types of communication, such as a telephone call, an email, a facsimile, a return call request, a live chat session request, and a display control request (which is a request to have another take control over a display viewable to the requester).

In an embodiment, an item to be handled by an agent is received at a database server. The item may be a media item that embodies a request for communication over any medium supported by the multi-media call center. The item may be stored in an item queue in a database. A number of agents may be registered with the database server. According to one embodiment, each agent is registered to handle specific types of items that the agent is eligible to handle. An agent, in this context, is a human operator capable of servicing an item.

According to one embodiment, the database server generates "eligible agent data" for each item. The eligible agent data for an item indicates which agents are eligible to handle the item. The eligible agent data for an item is stored, in association with the item, in a repository managed by the database server. The repository may be, for example, a database.

One way of expressing the eligible agent data for an item is by constructing a bitmap for the item, where each bit in the bitmap corresponds to a registered agent. In such an embodiment, the value of each bit in the bitmap indicates whether the agent that corresponds to the bit is eligible to handle the item.

The eligible agent data associated with items is used to determine which agents are to handle the items. After a particular agent is selected to handle an item, the item may be moved from the item queue to a matched item queue that is maintained in the database. The item may be removed from the matched item queue in response to receiving a request from the particular agent. For example, an agent may send a request to the database server to request an item to process. In response to such a request, the item may be removed from the matched item queue, and handled by the agent.

Advantageously, embodiments of the invention provide queuing and distribution functionality for a multi-media call center in a centralized location, such as a database management system. By centralizing the administration of the multi-media call center, the multi-media call center is easy to manage. Also, embodiments of the invention may scale to support a large number of users and may offer a high degree of availability.

Architectural Overview

FIG. 1 is a block diagram of the functional components of a system 100 according to an embodiment of the invention. System 100 enables items to be efficiently matched to an appropriate consumer, such as an agent. System 100 may be used to provide queuing and distribution functionality for a multi-media call center in a centralized location. System 100 includes clients 110 and 112, database management system (DBMS) 120, and a communications link 130. Each component of system 100 shall be described in further detail below.

A client, such as clients 110 and 112, may be implemented by any medium or mechanism that is capable of exchanging communications with DBMS 120. A client may serve a variety of functions in the system 100. A client may send information about an item to the DBMS 120. In this way, the DBMS 120 may be populated with information about numerous items. Alternatively, a client may be associated with a consumer of items, and the client may be used to transmit, to DBMS 120, a request to process an item. Non-limiting, illustrative examples of a client include an application executing on a device accessible to communications link 130. While only two clients, namely client 110 and 112, are shown in FIG. 1 for ease of explanation, system 100 may include any number of clients.

DBMS 120 is a software system that facilitates the storage and retrieval of electronic data, such as one or more items. DBMS 120 comprises a database server 122 and a database 124. Database server 122 performs operations on items maintained by database 124.

In an embodiment, database server 122 performs operations on item queue 126, consumer queue 127, and matched item queue 128. Item queue 126 is a data structure, physically stored in database 124, which stores items that have not been matched to a particular agent. When database server 122 receives an item, database server 122 may store the item, in addition to other information, in the item queue 128. Consumer queue 127 is a data structure, physically stored in database 124, which stores any requests, from consumers, for items that are received by database server 122. When database server 122 receives a request to consume an item, database server 122 may store the request to consume an item, in addition to other information, in the consumer queue 127.

Matched item queue 128 is a data structure, physically stored in database 124, which stores items that have been matched to a particular consumer. When database server 127 matches a particular request to consume an item with a particular item, the particular item being matched is moved from the item queue 126 to the matched item queue 128, and the particular request to consume an item is removed from the consumer queue 127. As used herein, an item is "matched" with a particular consumer if the particular consumer has been selected to handle the item.

Communications link 130 may be implemented by any medium or mechanism that provides for the exchange of data between client 110 and DBMS 120. Examples of communications link 130 include, without limitation, a network such as a Local Area Network (LAN), Wide Area Network (WAN), Ethernet or the Internet, or one or more terrestrial, satellite or wireless links.

Performing Queuing and Distribution Functionality for a Multi-Media Call Center

Figure 2:
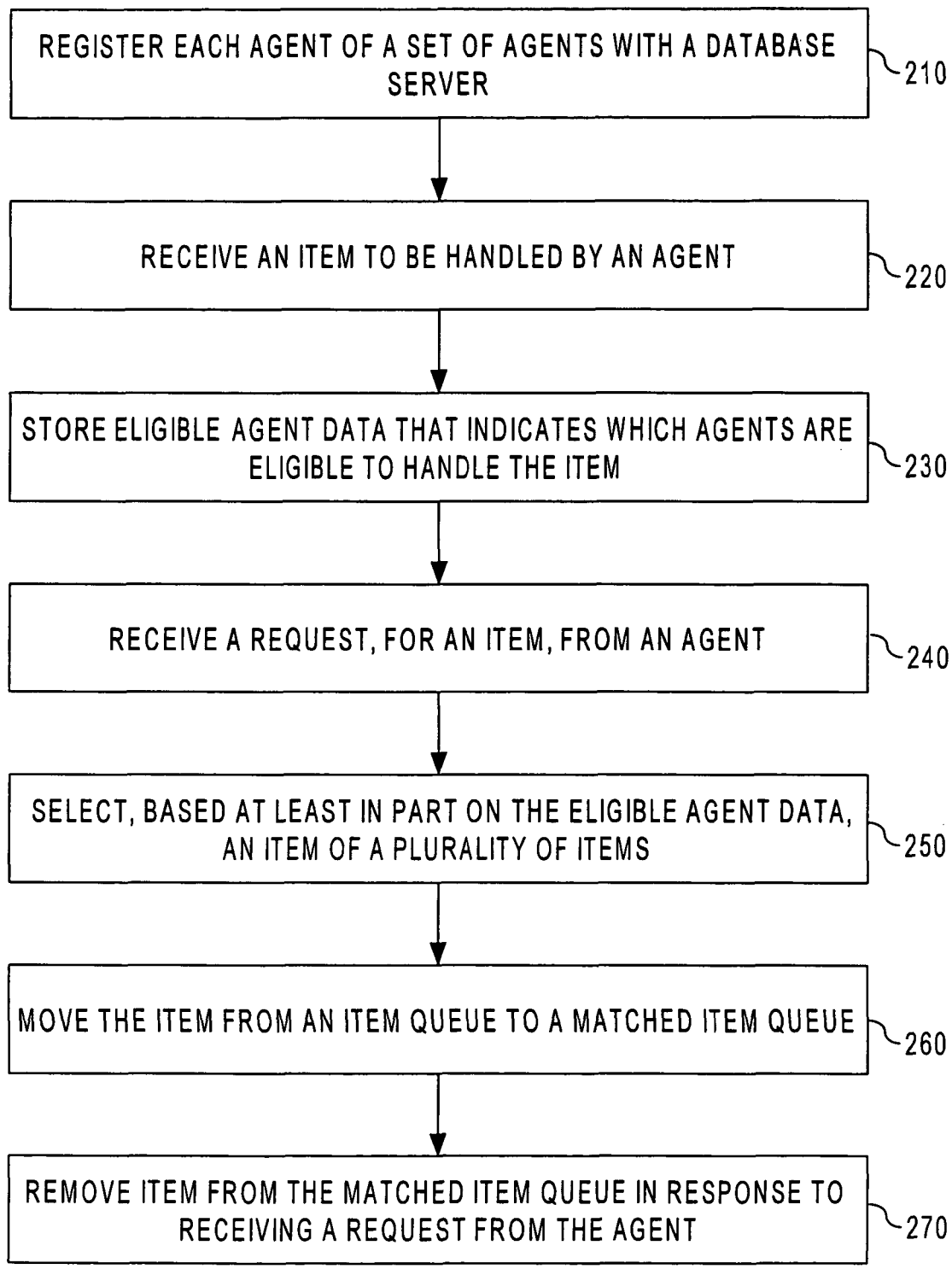
FIG. 2 is a flowchart illustrating the functional steps of an embodiment of the invention.

FIG. 2 is a flowchart illustrating the functional steps of an embodiment of the invention. FIG. 2 shall be explained below with reference to a system that matches a set of media items to a set of agents for ease of explanation. However, the context of embodiments of the invention are not limited to matching a set of media items to a set of agents, as embodiments of the invention may be used to match a set of items to a set of consumers. Thus, embodiments of the invention may be advantageously employed in many contexts outside of a multi-media call center, as any context wherein a set of items are consumed by a set of consumers would benefit from embodiments of the present invention.

In an embodiment of the invention, database server 122 may perform the functions described in FIG. 2. In other embodiments of the invention, other functional components of DBMS 120 may perform that functions described in FIG. 2. For example, functions performed by database server 122 may be performed by a separate server or functional component within DBMS 120. Consequently, embodiments of the invention are not limited to any particular functional component of DBMS 120 performing a particular step in FIG. 2.

In step 210, each agent, of a set of agents, is registered with database server 122. In performing step 210, each agent may be associated with a client 110. The agent may configure client 110 to issue a request, transmitted over communications link 130 to DBMS 120, to register the agent with the system 100. When the database server 122 receives the request, the database server 122 assigns each agent an agent identifier that uniquely identifies the agent. For example, the database server 122 may use a database sequence to assign a unique number to each registered agent.

In one embodiment, the database server 122 may assign agent identifiers using an integer value that starts with the value of "0." For example, the first registered agent is assigned an agent identifier of "0," the second registered agent is assigned an agent identifier of "1," and the third registered agent is assigned an agent identifier of "2," and so on. As explained below, the value of the agent identifier may correspond to a particular bit of a bitmap.

In one embodiment, when an agent is registered with the system 100, the system 100 stores information about which types of items that the agent can handle. For example, if a particular agent being registered in step 210 can handle items of type A and type B, then database server 122 may store data in database 124 indicating that the agent may only handle items of type A and type B. As explained in further detail below in step 230, information about which types of items a particular agent may handle is used in constructing eligible agent data. Note that not all embodiments store information about which types of items that an agent can handle, as some embodiments of the invention only assign an agent identifier to an agent in step 210.

After the performance of step 210, processing proceeds to step 220.

In step 220, an item to be handled by an agent is received at database server 122. The item may be sent to database server 122 over communications link 130 from a client 110.

The item received in step 220 may be a media item. In an embodiment, a media item may include data that identifies a telephone call, an email, a facsimile, a return call request, a live chat session request, and a display control request.

In an embodiment, a timestamp may be assigned to the item received in step 220. The timestamp, discussed in more detail below, may be used to view received items in their relative order of receipt. After the processing of step 220, processing proceeds to step 230.

In step 230, eligible agent data, in association with the item received in step 220, is stored in a repository managed by the database server 122. Eligible agent data is data that indicates which agents, of the set of registered agents, are eligible to handle the item. Step 230 may be performed by database server 122 storing the eligible agent data in database 124.

In an embodiment, step 230 may be performed by storing the item, and its associated eligible agent data, in item queue 126. The eligible agent data and the item may be stored in a table, in database 124, that is the subject of a database view that presents items stored in the table in FIFO (first in, first out) order. In the performance of step 230, each item, and its associated eligible agent data, may also be stored with a timestamp. The timestamp may be assigned when the item is received in step 220. The database view may be used to view all the items stored in the table in order of their associated timestamp.

In an embodiment, item characteristic data may be stored with the item in step 230. Item characteristic data is data that describes the characteristics of the item, such as the service level associated with the item.

In an embodiment, eligible agent data may be represented as a bitmap. Each bit of the bitmap may be associated with a registered agent. The agent identifier may indicate which bit of the bitmap is associated with the agent. For example, an agent identifier of "1" may indicate the first bit of the bitmap, an agent identifier of "2" may indicate the second bit of the bitmap, and an agent identifier of "3" may indicate the third bit of the bitmap.

Each bit of the bitmap indicates whether the agent associated with the bit is eligible to handle the item. For example, assume that agent 1 is associated with the first bit of the bitmap, agent 2 is associated with the second bit of the bitmap, and agent 3 is associated with the third bit of a bitmap. If the database server 122 determines that agent 1 and agent 3 are eligible to handle the item, then within the bitmap for the item, the bit associated with those agents may be assigned a value of "1," and the bit associated with agent 2 may be assigned a value of "0," resulting in a bitmap of "101."

In one embodiment, the database server 122 may determine whether a particular agent is eligible to handle a particular item by consulting a set of routing rules in or accessible to database 122. The routing rules indicate which registered agents are eligible to handle a particular item stored in the item queue 126. The routing rules may determine whether a particular registered agent is eligible to handle a particular item based on a variety of factors, such as the item characteristic data associated with each item.

In another embodiment, the database server 122 may determine whether a particular agent is eligible to handle a particular item based on whether the particular agent can handle the type of communication associated with the particular item. As explained above in step 210, database server 122 may store information in database 124 about which types of items that a particular agent can handle. If a particular item corresponds to a telephone call, and if a particular agent can handle an incoming phone call, then the bit in the bitmap that is associated with that agent will indicate that the agent may handle the item. On the other hand, if a particular item corresponds to a live chat session request, and if a particular agent cannot handle a live chat session request, then the bit in the bitmap that is associated with the particular agent will indicate that the agent cannot handle the item. After the performance of step 230, processing proceeds to step 240.

In step 240, a request for an item is received from an agent. The request of step 240 may be transmitted by an agent associated with client 110 over communications link 130. The request of step 240 may be received by database server 122.

The purpose of step 240 is for a particular agent to communicate to database 122 that the particular agent is able to handle a new item. When database server 122 receives the request of step 240, database server 122 stores the request in the consumer queue 127. In an embodiment, a timestamp may be assigned to the request received in step 240, and stored in association with the request, in the consumer queue 127. Timestamps stored in association with a request in the consumer queue 127 may be used to view requests stored in the consumer queue 127 in their relative order of receipt. The consumer queue 127 may be the subject of a database view that presents items stored in the consumer queue 127 in FIFO order.

Note that the system 100 may store items in the item queue 126 and may store requests in the consumer queue 127 in parallel. In other words, the database server 122 may receive items at any time, and the database server 122 may receive requests from agents at any time. Each time that an item is received, it is stored in the item queue 126, and each time a request from an agent is received, it is stored in the consumer queue 127. Thus, while the steps of FIG. 2 are explained sequentially herein for ease of explanation, it shall be understood to those in the art that one or more steps of FIG. 2 may be performed in a different order, or in parallel, than that displayed in FIG. 2, e.g., step 240 may be performed one or more times before step 220 is performed, or step 220 may be performed two or more times before step 240 is performed.

In an embodiment, database server 122 stores, in association with the request, agent request characteristic data, in the consumer queue 127. Agent request characteristic data is data that describes the characteristics of the agent request. Agent request characteristic data may be used by the database server 122 to ensure that each agent request is matched with an appropriate item. Agent request characteristic data may be different for two different requests issued from the same agent, as each request from an agent may correspond to a different set of characteristics, e.g., a first request may be for an item associated with a first set of item characteristic data and a second request from the same agent may be for an item with a different set of item characteristic data.

Agent request characteristic data may describe the types of communications to which the particular request may be matched. For example, agent request characteristic data may describe whether the request of the agent may be matched with one or more of the following: a telephone call initiated by a third party, an email, a facsimile, a telephone call initiated by the agent, a live chat session, and controlling the display of a third party.

Agent request characteristic data may also describe which service levels to which items a particular request may be matched. Items may be associated with a service level, such a first service level associated with a high quality level of service or a second service level associated with a lower quality level of service. For example, a company may offer a gold level service that guarantees that an item will be handled by an agent within a certain time frame, and a bronze level service that does not guarantee that the item will be handled by an agent within a certain time frame.

In addition, agent request characteristic data may describe any other characteristic that may be used in matching an appropriate item to a particular request. After the performance of step 240, processing proceeds to step 250.

In step 250, an appropriate item, in the item queue 126, is selected based, at least in part, on the eligible agent data stored with each item in the item queue 126. In an embodiment, step 250 may be performed by database server 122 (a) selecting the next request from an agent ("the next available agent") from the consuming queue 127, and (b) determining which item in the item queue 126 that the next available agent should handle. The purpose of step 250 is to match the next available agent in the consumer queue 127 with the next item in the item queue 126 which the next available agent may handle.

The database server 122 will select the next item in the item queue 126 for the next available agent to handle where (a) the eligible agent data for the item indicates that the next available agent may handle the selected item, and (b) the agent request characteristic data of the next available agent does not conflict with the attributes of the item characteristic data associated with the selected item.

The database server 122 may execute a database query against the database view on the item queue 126. Execution of the query may cause database server 122 to select those items in the item queue 126 that (a) are associated with item characteristic data that corresponds to agent request characteristic data associated with the next available agent, and (b) the eligible agent data for the item indicates that the next available agent may handle the item. As the database view provides a FIFO order of the item queue 126, the first item returned from the database query will be assigned by the database server 122 to the next available agent to handle.

For example, if a particular agent can handle incoming telephone calls and email, and the particular agent only handles items associated with a gold service level, the particular agent will be assigned to the oldest item in the item queue 126 that corresponds to either a telephone call or an email and is associated with a gold service level. The database server 122 determines the characteristics of the agent, such as what types of communications the agent may handle, by consulting the agent characteristic data for the particular agent that is stored in the database 124.

Step 250 may be performed in response to a variety of activities. In one embodiment, step 250 may be performed any time database server 122 associates an item with eligible agent data. Thus, each time that database server 122 associates an item with eligible agent data, the database server 122 (a) consults the consumer queue 127 to determine the next available agent, and thereafter (b) performs step 250 by matching the next available agent with an item stored in the item queue 127. If either the item queue 126 or the consumer queue 127 do not contain any items, then database server 122 may delay performing step 250 until both the item queue 126 and the consumer queue 127 each contain at least one entry.

Alternatively, database server 122 may perform step 250 independent of when database server 122 performs step 240. For example, in an embodiment, step 250 may be performed in response to the expiration of a configurable amount of time, such as after the expiration of a five second interval, since the last time step 250 was performed. In another embodiment, step 250 may be performed in response to the occurrence of a particular event, such as anytime that a request is added to the consumer queue 127 when a configurable number of requests already exist in the consumer queue 127. Such an embodiment allows requests to be added to the consumer queue 127 asynchronously to their removal in a manner that prevents the consume queue 127 from growing in an uncontrolled rate.

Once the next available agent has been matched to an item in step 250, the request associated with the next available agent is removed from the consumer queue 127. In this way, only requests that have not been matched are stored in the consumer queue 127. After the performance of step 250, processing proceeds to step 260.

In step 260, once a request from an agent stored in the consumer queue 127 is matched with an item stored in the item queue 126, the matched item, and any associated data, is moved from the item queue 126 to the matched item queue 128. Also, once a particular request for an item stored in the consumer queue 127 is matched to an item, the request for an item is removed from the consumer queue 127. Items stored in the matched item queue 128 have been matched to a particular agent. The performance of step 260 advantageously allows items stored in item queue 126 to be restricted to unmatched items.

Step 260 and step 270 are optional. Certain embodiments of the invention may not perform steps 260 and 270. For example, in one embodiment, once a particular item in the item queue 126 is matched to an available agent, the matched item is removed from the item queue 126, and transmitted to the available agent for processing. After the performance of step 260, processing proceeds to step 270.

In step 270, the item is removed from the matched item queue 128 in response to receiving a request (such as, for example, a polling request or a blocking request) from the available agent. In this way, items stored in the matched item queue 128 reflect those items that are matched, but not currently being handled by an agent.

Advantageously, queuing and distribution functionality for a multi-media call center may be performed using embodiments of the invention in a scalable, easy-to-manage manner. Embodiments are scalable because the functionality is performed by a database management system. Further, the database management system is easy and cost-efficient to manage. Also, a database management system provides a high degree of availability, e.g., a real application cluster (RAC), available from Oracle Corporation, of Redwood Shores, Calif., may be employed to ensure if one database server becomes unavailable, another database server may automatically perform the functionality of the unavailable database server with a minimum of downtime.

As discussed above, embodiments of the invention are not limited to the use of agents, as any consumer of items may be employed. Consequently, embodiments of the invention may be employed in a variety of contexts outside of a multi-media call center, e.g., any context wherein a plurality of items are consumed by a plurality of consumers according to a set of rules may benefit from the embodiments described above.

Implementing Mechanisms

Figure 3:
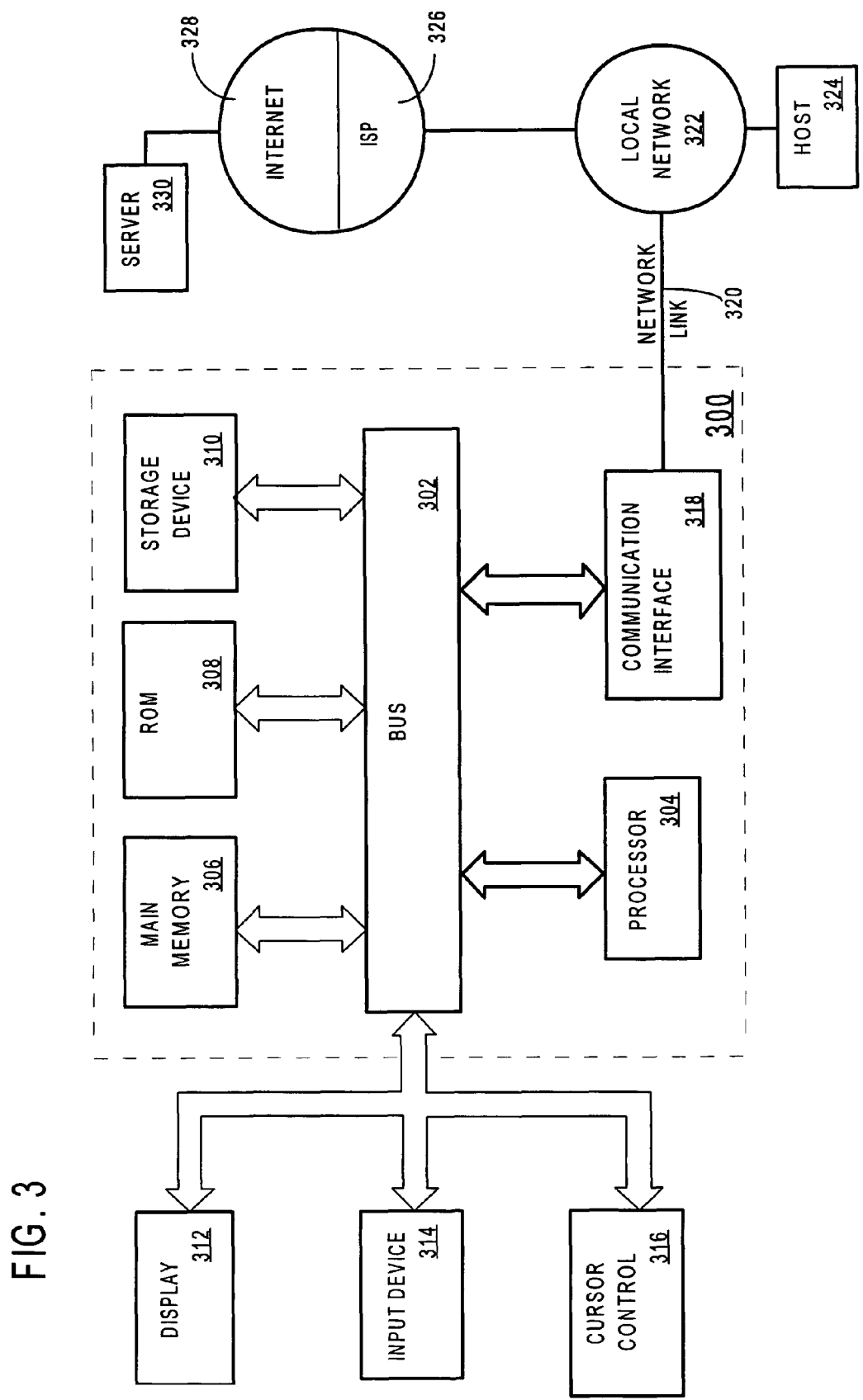
FIG. 3 is a block diagram that illustrates a computer system upon which an embodiment of the invention may be implemented.

A client, a database server, and a database may each be implemented on a computer system. FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising:
    receiving, at a database server, an unhandled item to be handled by one of a set of consumers;
    wherein the unhandled item has an item type that is a member from the group consisting of: a telephone call, an email, a facsimile, a return call request, a live chat session request, and a display control request;
    adding the unhandled item to an unmatched item queue managed by the database server;
    storing, in a consumer request queue, requests from at least two particular consumers to handle one or more items;
    storing, in association with said unhandled item, in a repository managed by the database server, eligible consumer data that indicates which consumers of the set of consumers are eligible to handle said unhandled item, wherein the eligible consumer data indicates that said at least two particular consumers are eligible to handle said unhandled item;
    selecting, based at least in part on said eligible consumer data and said unmatched item queue, one particular consumer of said at least two particular consumers to handle said unhandled item, wherein the unhandled item is matched to the one particular consumer and no other consumers; and
    in response to the selecting said one particular consumer to handle said unhandled item, removing the unhandled item from the unmatched item queue and adding the unhandled item to a matched item queue;
    wherein the matched item queue includes unhandled items that have been matched to one consumer and no other consumers, and the unmatched item queue includes unhandled items that have not been matched to one consumer and no other consumers;
    wherein the method is performed by one or more computing devices.

2. A machine-implemented method, comprising:
    receiving, at a database server, an unhandled item to be handled by one of a set of agents;
    adding the unhandled item to an unmatched item queue managed by the database server;
    wherein the unhandled item has an item type that is a member from the group consisting of: a telephone call, an email, a facsimile, a return call request, a live chat session request, and a display control request;
    storing, in an agent request queue, requests from at least two particular agents to handle one or more items;
    storing, in association with said unhandled item, in a repository managed by the database server, eligible agent data that indicates which agents of the set of agents are eligible to handle said unhandled item, wherein the eligible agent data indicates that said at least two particular agents are eligible to handle said unhandled item;
    selecting, based at least in part on said eligible agent data and said unmatched item queue, one particular agent of said at least two particular agents to handle said unhandled item, wherein the unhandled item is matched to the one particular agent and no other agents; and
    in response to the selecting said one particular agent to handle said unhandled item, removing the unhandled item from the unmatched item queue and adding the unhandled item to a matched item queue;
    wherein the matched item queue includes unhandled items that have been matched to one agent and no other agents, and the unmatched item queue includes unhandled items that have not been matched to one agent and no other agents;
    wherein the method is performed by one or more computing devices.

3. The method of claim 2, wherein said unhandled item is a first unhandled item, wherein said one particular agent is a first particular agent, wherein said eligible agent data is first eligible agent data, and the method further comprising:
    receiving, at said database server, a second unhandled item to be handled by one of said set of agents;
    adding the second unhandled item to said unmatched item queue;
    storing, in association with said second unhandled item, in said repository, second eligible agent data that indicates which agents of said set of agents are eligible to handle said second unhandled item; and
    selecting, based at least in part on said second eligible agent data and said unmatched item queue, a second particular agent of said set of agents is to handle said second unhandled item,
    wherein said first unhandled item and said second unhandled item are of different item types; and
    in response to selecting the second particular agent to handle said second unhandled item, removing the second unhandled item from the unmatched item queue and adding the second unhandled item to the matched item queue.

4. The method of claim 3, wherein the item type of said first unhandled item and the item type of said second unhandled item each identify a different member from the group consisting of: a telephone call, an email, a facsimile, a return call request, a live chat session request, and a display control request.

5. The method of claim 2, wherein said step of storing said eligible agent data comprises:
    constructing a bitmap, where each bit in the bitmap indicates whether a corresponding agent is eligible for handling the unhandled item.

6. The method of claim 2, wherein the matched item queue includes a plurality of unhandled items, further comprising:
    removing said unhandled item from said matched item queue in response to receiving a request from said one particular agent to handle said unhandled item from the matched item queue.

7. The method of claim 2, wherein said unhandled item is one of a plurality of unhandled items, and wherein said step of selecting the one particular agent is performed in response to receiving a request, from said one particular agent, to process any one of said plurality of items that matches agent request characteristic data from said one particular agent.

8. The method of claim 2, further comprising:
    retrieving data identifying said one particular agent of said set of agents from the agent request queue.

9. The method of claim 2, wherein the unhandled item is associated with item characteristic data that describes characteristics of the unhandled item, wherein requests in the agent request queue are associated with request characteristic data that describes characteristics of the requests, and wherein selecting, based at least in part on said eligible agent data and said unmatched item queue, comprises:
determining that the item characteristic data is associated with the request characteristic data of a request from the one particular agent.

10. The method of claim 6,
wherein the request from said one particular agent to handle said unhandled item from the matched item queue is a polling request from the one particular agent to handle said unhandled item; and
further comprising:
in response to receiving the polling request, transmitting the unhandled item to the one particular agent for processing.

11. The method of claim 2, further comprising:
receiving a blocking request from the one particular agent, wherein the blocking request is associated with request characteristic data that describes characteristics of the blocking request;
wherein said eligible agent data is based at least in part on the request characteristic data;
wherein the unhandled item is associated with item characteristic data that describes characteristics of the unhandled item;
determining that the item characteristic data is associated with the request characteristic data;
removing the unhandled item from the matched item queue; and
transmitting the unhandled item to the one particular agent for processing.

12. The method of claim 2, wherein said unhandled item is a first unhandled item, wherein said eligible agent data is a first eligible agent data that is based at least in part on a first agent request characteristic data received from the one particular agent;
wherein the method further comprises:
receiving, at said database server, a second unhandled item to be handled by one of said set of agents;
adding the second unhandled item to said unmatched item queue;
storing, in association with said second unhandled item, in said repository, second eligible agent data that indicates which agents of said set of agents are eligible to handle said second unhandled item;
wherein the second eligible agent data is based at least in part on a second agent request characteristic data received from the one particular agent;
selecting, based at least in part on: said second eligible agent data and said unmatched item queue, the one particular agent to handle said second unhandled item;
wherein the second agent request characteristic data differs by at least one item characteristic from the first agent request characteristic data;
removing the second unhandled item from the unmatched item queue and adding the second unhandled item to the matched item queue.

13. The method of claim 12, wherein said first item and said second item are of different item types.

14. The method of claim 12, wherein the first eligible agent data is different from the second eligible agent data.

15. The method of claim 2, wherein the matched item queue includes one or more other items, for each of which another particular agent has been selected.

16. A non-transitory machine-readable medium storing one or more sequences of instructions, wherein execution of the one or more sequences of instructions by one or more processors causes the one or more processors to perform:
receiving, at a database server, an unhandled item to be handled by one of a set of consumers;
wherein the unhandled item has an item type that is a member from the group consisting of: a telephone call, an email, a facsimile, a return call request, a live chat session request, and a display control request;
adding the unhandled item to an unmatched item queue managed by the database server;
storing, in a consumer request queue, requests from at least two particular consumers to handle one or more items;
storing, in association with said unhandled item, in a repository managed by the database server, eligible consumer data that indicates which consumers of the set of consumers are eligible to handle said unhandled item, wherein the eligible consumer data indicates that said at least two particular consumers are eligible to handle said unhandled item;
selecting, based at least in part on said eligible consumer data and said unmatched item queue, one particular consumer of said at least two particular consumers to handle said unhandled item, wherein the unhandled item is matched to the one particular consumer and no other consumers; and
in response to the selecting said one particular consumer to handle said unhandled item, removing the unhandled item from the unmatched item queue and adding the unhandled item to a matched item queue;
wherein the matched item queue includes unhandled items that have been matched to one consumer and no other consumers and the unmatched item queue includes unhandled items that have not been matched to one consumer and no other consumers.

17. A non-transitory machine-readable medium storing one or more sequences of instructions, wherein execution of the one or more sequences of instructions by one or more processors causes the one or more processors to perform:
receiving, at a database server, an unhandled item to be handled by one of a set of agents;
adding the unhandled item to an unmatched item queue managed by the database server;
wherein the unhandled item has an item type that is a member from the group consisting of: a telephone call, an email, a facsimile, a return call request, a live chat session request, and a display control request;
storing, in an agent request queue, requests from at least two particular agents to handle one or more items;
storing, in association with said unhandled item, in a repository managed by the database server, eligible agent data that indicates which agents of the set of agents are eligible to handle said unhandled item, wherein the eligible agent data indicates that said at least two particular agents are eligible to handle said unhandled item;
selecting, based at least in part on said eligible agent data and said unmatched item queue, one particular agent of said at least two particular agents to handle said unhandled item, wherein the unhandled item is matched to the one particular agent and no other agents; and
in response to the selecting said one particular agent to handle said unhandled item, removing the unhandled item from the unmatched item queue and adding the unhandled item to a matched item queue:, wherein the matched item queue includes unhandled items that have been matched to one agent and no other agents, and the unmatched item queue includes unhandled items that have not been matched to one agent and no other agents.

18. The machine-readable medium of claim 17, wherein said unhandled item is a first unhandled item, wherein said one particular agent is a first particular agent, wherein said eligible agent data is first eligible agent data, and wherein the one or more processors further perform:

receiving, at said database server, a second unhandled item to be handled by one of said set of agents;

adding the second unhandled item to said unmatched item queue;

storing, in association with said second unhandled item, in said repository, second eligible agent data that indicates which agents of said set of agents are eligible to handle said second unhandled item; and selecting, based at least in part on said second eligible agent data and said unmatched item queue, a second particular agent of said set of agents to handle said second unhandled item, wherein said first unhandled item and said second unhandled item are of different item types; and in response to selecting the second particular agent to handle said second unhandled item, removing the second unhandled item from the queue of items and adding the second unhandled item to the matched item queue.

19. The machine-readable medium of claim 18, wherein the item type of said first unhandled item and the item type of said second unhandled item each identify a different member from the group consisting of: a telephone call, an email, a facsimile, a return call request, a live chat session request, and a display control request.

20. The machine-readable medium of claim 17, wherein said step of storing said eligible agent data comprises:

constructing a bitmap, where each bit in the bitmap indicates whether a corresponding agent is eligible for handling the unhandled item.

21. The machine-readable medium of claim 17, wherein the matched item queue includes a plurality of unhandled items, and wherein the one or more processors further perform removing said unhandled item from said matched item queue in response to receiving a request from said one particular agent to handle said unhandled item from the matched item queue.

22. The machine-readable medium of claim 17, wherein said unhandled item is one of a plurality of unhandled items, and wherein said step of selecting the one particular agent is performed in response to receiving a request, from said one particular agent, to process any one of said plurality of items that matches agent request characteristic data from said one particular agent.

23. The machine-readable medium of claim 17, wherein the one or more processors further perform retrieving data identifying said one particular agent of said set of agents from the agent request queue.

24. The machine-readable medium of claim 21, wherein the unhandled item is associated with item characteristic data that describes characteristics of the unhandled item, wherein requests in the agent request queue are associated with request characteristic data that describes characteristics of the request, and wherein the one or more processors perform selecting, based at least in part on said eligible agent data and said unmatched item queue, by:

determining that the item characteristic data is associated with the request characteristic data of a request from the one particular agent.

25. The machine-readable medium of claim 21, wherein the request from said one particular agent to handle said unhandled item from the matched item queue is a polling request from the one particular agent to handle said unhandled item; and wherein the one or more processors further perform:

in response to receiving the polling request, transmitting the unhandled item to the one particular agent for processing.

26. The machine-readable medium of claim 17, wherein the one or more processors further perform:

receiving a blocking request from the one particular agent, wherein the blocking request is associated with request characteristic data that describes characteristics of the blocking request;

wherein said eligible agent data is based at least in part on the request characteristic data;

wherein the unhandled item is associated with item characteristic data that describes characteristics of the unhandled item;

determining that the item characteristic data is associated with the request characteristic data;

removing the unhandled item from the matched item queue; and transmitting the unhandled item to the one particular agent for processing.

27. The machine-readable medium of claim 17, wherein said unhandled item is a first unhandled item, wherein said eligible agent data is a first eligible agent data that is based at least in part on a first agent request characteristic data received from the one particular agent;

wherein the one or more processors further perform:

receiving, at said database server, a second unhandled item to be handled by one of said set of agents;

adding the second unhandled item to said unmatched item queue;

storing, in association with said second unhandled item, in said repository, second eligible agent data that indicates which agents of said set of agents are eligible to handle said second unhandled item;

wherein the second eligible agent data is based at least in part on a second agent request characteristic data received from the one particular agent;

selecting, based at least in part on said second eligible agent data and said unmatched item queue, the one particular agent to handle said second unhandled item;

wherein the second agent request characteristic data differs by at least one item characteristic from the first agent request characteristic data;

removing the second unhandled item from the unmatched item queue and adding the second unhandled item to the matched item queue.

28. The machine-readable medium of claim 27, wherein said first item and said second item are of different item types.

29. The machine-readable medium of claim 27, wherein the first eligible agent data is different from the second eligible agent data.

30. The machine-readable medium of claim 17, wherein the matched item queue includes one or more other items, for each of which another particular agent has been selected.

* * * * *

UNITED STATES PATENT AND TRADEMARK OFFICE
CERTIFICATE OF CORRECTION

PATENT NO. : 7,792,274 B2  Page 1 of 1
APPLICATION NO. : 10/981982
DATED : September 7, 2010
INVENTOR(S) : Sonali Inamdar It is certified that error appears in the above-identified patent and that said Letters Patent is hereby corrected as shown below:

Column 12, Claim 3, Line 28, between agents and to, delete "is"

Column 14, Claim 17, Line 61, replace ":," with --;--

Column 16, Claim 25, Line 5, delete "agent"

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

PATENT NO.        : 7,792,274 B2                                   Page 1 of 1
APPLICATION NO.   : 10/981982
DATED             : September 7, 2010
INVENTOR(S)       : Sonali Inamdar It is certified that error appears in the above-identified patent and that said Letters Patent is hereby corrected as shown below:

In column 2, line 51, delete "requester)." and insert -- requestor). --, therefor.

In column 14, line 30, in claim 16, after "consumers" insert -- , --.

Signed and Sealed this
Twenty-sixth Day of July, 2011

David J. Kappos
*Director of the United States Patent and Trademark Office*